May 19, 1936.  W. J. DE WITT ET AL  2,041,532
APPARATUS FOR MAKING SHOE SOLES
Original Filed April 10, 1933
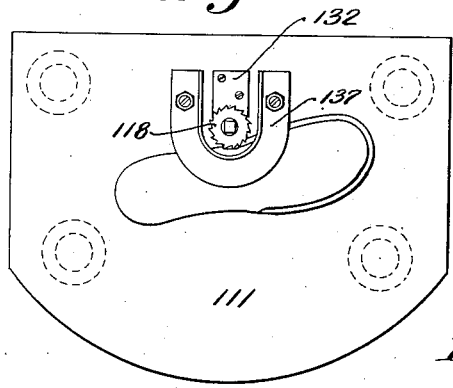
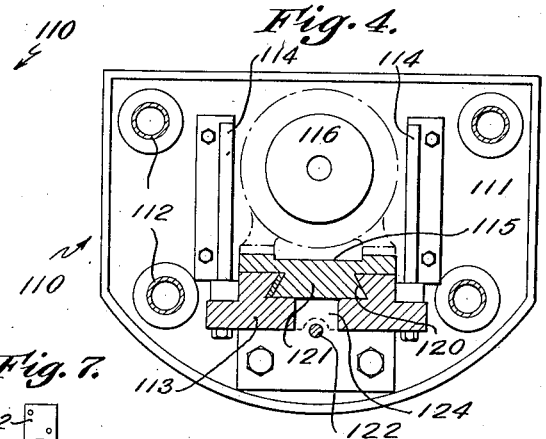
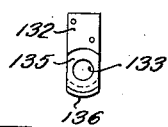
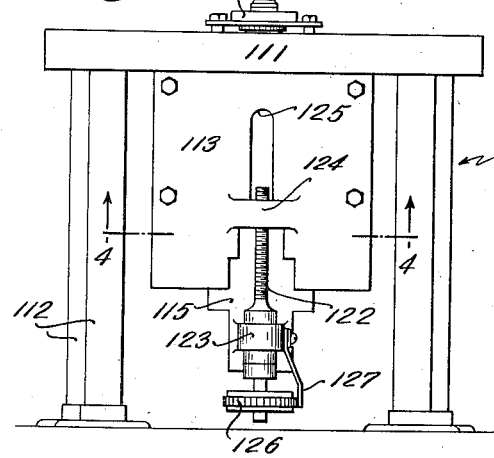
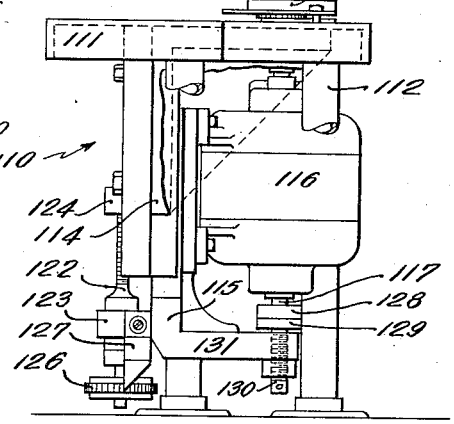
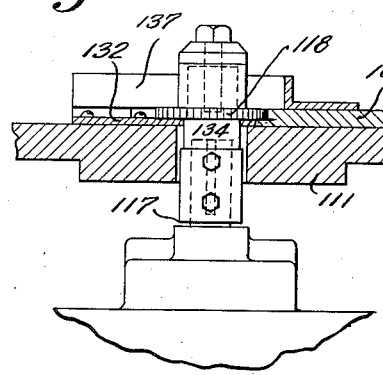
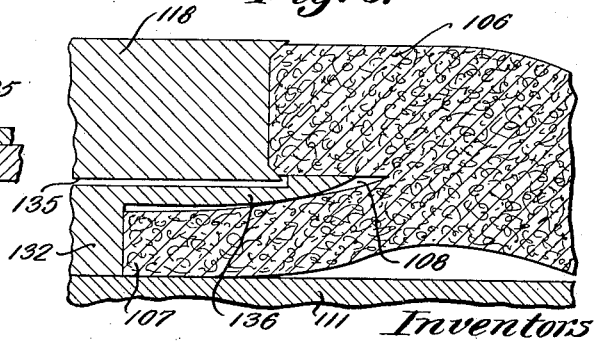
Inventors
William J. De Witt
Erle Floyd Beers
by Roberts, Cushman & Woodbury
Attys.

Patented May 19, 1936

2,041,532

UNITED STATES PATENT OFFICE 2,041,532

APPARATUS FOR MAKING SHOE SOLES

William J. De Witt and Erle Floyd Beers, Auburn, N. Y., assignors to Dun Deer Sandals, Inc., Auburn, N. Y., a corporation of Delaware Original application April 10, 1933, Serial No. 665,296. Divided and this application May 25, 1935, Serial No. 23,392

6 Claims. (Cl. 12—17)

This invention relates to an improvement in apparatus for making shoe soles being a further development of the invention disclosed in Patent No. 1,843,753 dated February 2, 1932 and has for its primary object to provide a machine for trimming one lip of the split edge of a shoe sole, one of the steps in the preparation of such soles for the assembly of shoe uppers therewith. The present application is a division of our co-pending application Serial No. 665,296, filed April 10, 1933.

In the drawing:

Fig. 1 is a plan view of one form of machine embodying the present invention;

Figs. 2 and 3 are front and side views of such machine;

Fig. 4 is a sectional view taken along the line 4—4 in Fig. 2;

Fig. 5 is a sectional view of the trimming tool in operation upon a shoe sole;

Fig. 6 is an enlarged view illustrating the trimming operation; and

Fig. 7 is a plan view of one element of the machine.

The shoe sole 105 having been blanked and the edge having been thereafter split in any well known manner as for example in accordance with the disclosure in the above mentioned patent or application is provided with lower and upper lips 106 and 107 respectively. The present invention relates to the trimming of the lower lip 106 by means, for example, of the machine 110.

The machine 110 comprises a bed plate 111 upon posts 112 and from which depends a wall 113 braced by angle brackets 114. An adjustable frame 115 carried by the wall 113 supports a motor 116 in the vertical position. Fixed to the shaft 117 of the motor is a milling cutter 118 which projects above the bed plate as shown for example in Fig. 5. An undercut channel 120 on the wall 113 receives the complementarily formed tongue 121 on the frame 115 as shown in Fig. 4. The frame is raised or lowered relative to the wall by an adjusting screw 122 rotatably supported in a boss 123 on the frame 115 and threadedly engaged with a boss 124 on the wall 113. A slot 125 in the wall allows the free travel of the screw and a knurled wheel 126 at the head of the screw which permits its easy rotation is yieldably held against unwanted turning by a spring strip 127.

At the lower end of the motor shaft is secured an antifriction bearing 128 which rests upon a cup 129 carried by a stem 130 having an adjustable threaded engagement with the foot 131 of the motor frame. Fixed on the bed plate 111 below the milling cutter is a work positioning plate 132 having an opening 133 through which the stem 134 of the cutter passes and a depression 135 which surrounds the opening 133 to receive the cutter. The plate 132 terminates in a tongue 136 which projects beyond the cutter and, as shown in Fig. 6 enters the split 108 in the sole, while the lower edge of the cutter is received in the depression so that it is out of contact with the lip 106. Mounted upon the bed plate 111 is a U-shaped angular guard 137 beneath which the sole is fed to the cutter (see Fig. 5).

The blanked and split sole is turned over and pushed below the guard 137 the tongue 136 entering the split 108 and guiding the lower lip 106 to the cutter. The upper lip 107 passes below the tongue and the milling operation continues until the edge of that lip bears against the plate 132 as shown in Fig. 6. The plate 132 thus acts to limit the depth of the milling operation and to insure that the edge of the lower lip is properly and uniformly finished and that any rough edges are removed.

While one embodiment of this invention has been shown and described it will be understood that we are not limited thereto and that other embodiments may be made without departing from the spirit and scope of the invention as set forth in the following claims.

We claim:

1. A machine for trimming the lower lip of a shoe sole, the edge of which has been split to provide upper and lower lips, comprising a bed plate, a milling cutter above the bed plate and a stationary positioning plate fixed upon the bed plate and located between the bed plate and cutter, said positioning plate having a tongue which enters the split in the sole edge and guides the lower lip into contact with the cutter while holding the upper lip out of such contact.

2. A machine for trimming the lower lip of a shoe sole the edge of which has been split to provide upper and lower lips, comprising a bed plate, a milling cutter above the bed plate and a stationary positioning plate fixed upon the bed plate and located between the bed plate and cutter, said positioning plate having a tongue which enters the split in the sole edge and guides the lower lip into contact with the cutter while holding the upper lip out of such contact, the tongue projecting from the upper edge of the positioning plate and the upper lip of the sole coacting with the lower edge of said positioning plate below said tongue to determine the extent of the trimming operation.

3. A machine for trimming the lower lip of a shoe sole the edge of which has been split to provide upper and lower lips, comprising a bed plate, a milling cutter above the bed plate and a stationary positioning plate fixed upon the bed plate and located between the bed plate and cutter, said positioning plate having a tongue projecting therefrom, a depression being formed in the upper surface of the positioning plate and tongue which receives the lower edge of the cutter, said tongue being adapted to enter the split in the sole edge whereby the tongue holds the upper lip out of contact with the cutter and the tongue and depression coact to guide the lower lip into contact with the cutter above the lower edge thereof.

4. A machine for trimming the lower lip of a shoe sole the edge of which has been split to provide upper and lower lips, comprising a bed plate, a milling cutter above the bed plate and a positioning plate located between the bed plate and cutter, said positioning plate having a tongue projecting therefrom, a depression being formed in the upper surface of the positioning plate and tongue which receives the lower edge of the cutter, said tongue being adapted to enter the split in the sole edge whereby the tongue holds the upper lip out of contact with the cutter and the tongue and depression coact to guide the lower lip into contact with the cutter above the lower edge thereof, the tongue projecting from the upper edge of the positioning plate, and the upper lip of the sole coacting with the lower edge of the positioning plate below the tongue to determine the extent of the trimming operation.

5. A machine for trimming the lower lip of a shoe sole, the edge of which has been split to provide upper and lower lips, comprising a bed plate, a milling cutter above the bed plate, a positioning plate between the cutter and bed plate, a guard between which and the bed plate the sole is fed to the cutter, a shaft carrying said cutter, means for rotating said shaft, means for shifting said shaft axially to raise or lower said cutter, and a tongue projecting from said positioning plate which enters the split in the edge of the fed sole thereby guiding the lower lip into contact with the cutter and holding the upper lip out of such contact.

6. A machine for trimming the lower lip of a shoe sole, the edge of which has been split to provide upper and lower lips, comprising a bed plate, a milling cutter above the bed plate, a positioning plate between the cutter and the bed plate, a guard between which and the bed plate the sole is fed to the cutter, a shaft carrying the cutter, means for rotating said shaft, a tongue projecting from said positioning plate which enters the split in the edge of the fed sole and holds the upper lip out of contact with the cutter, and said positioning plate having a depression in the face thereof to receive the lower edge of the cutter so that the lower lip is guided by said tongue into contact with the cutter above the lower edge thereof.

WILLIAM J. DE WITT.
ERLE FLOYD BEERS.